Figure 1:
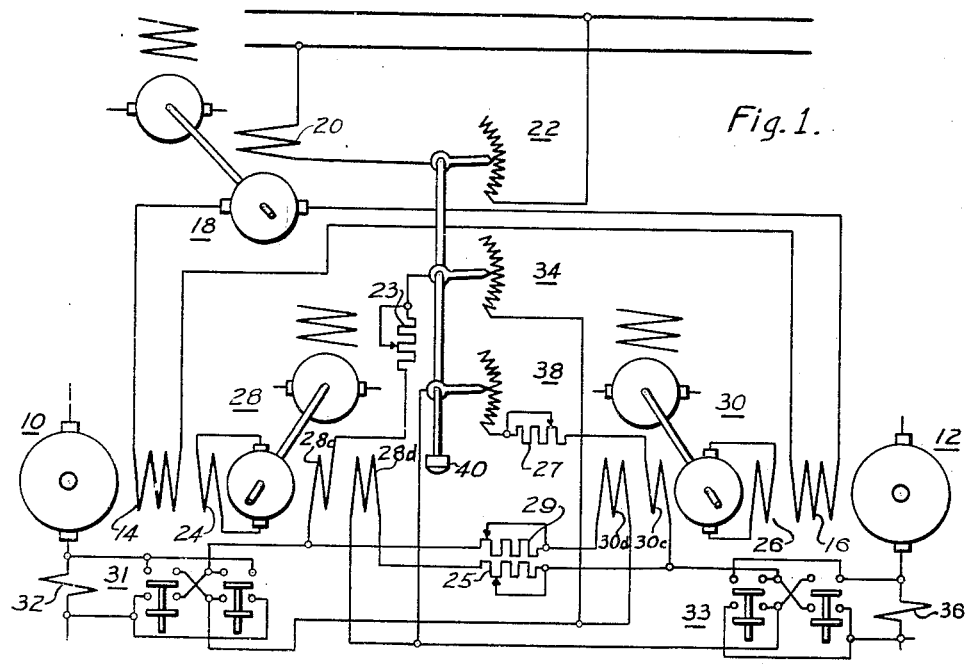

April 15, 1941.  R. H. WRIGHT  2,238,406

CONTROL SYSTEM FOR DYNAMOELECTRIC MACHINES

Filed Sept. 23, 1937

WITNESSES:

INVENTOR
Ralph H. Wright.
BY
ATTORNEY

Patented Apr. 15, 1941

2,238,406

UNITED STATES PATENT OFFICE 2,238,406

CONTROL SYSTEM FOR DYNAMOELECTRIC MACHINES

Ralph H. Wright, Edgewood, Pa., assignor to Westinghouse Electric & Manufacturing Company, East Pittsburgh, Pa., a corporation of Pennsylvania Application September 23, 1937, Serial No. 165,288

3 Claims. (Cl. 171—312)

My invention relates, generally, to control systems for dynamoelectric machines, and, more particularly, to a control system for automatically dividing a common load between two dynamoelectric machines in predetermined proportions and for maintaining the desired speed load characteristic curves for such machines.

Many manufacturing operations require that a plurality of motors or generators be connected to carry a common load. An example of such use of a plurality of machines is the twin motor drive for steel rolling mills in which a separate motor drives each of the two cooperating rolls of the roll stand.

Where motors are connected to drive a common load, it is necessary that each share its part of the load proportionate to its capacity in order that the motors may operate most efficiently, that the total capacity of the motors be a maximum, that one of the motors may not be damaged by overloading, and that there be no tendency in the case of metal rolling mills for the metal to issue from the rolls in other than a horizontal line.

It is also desirable that motors so operated have such compounding characteristics as to produce the desired speed load characteristic curve. It has been found that the degree of compounding necessary for the best regulation varies with the strength of the main or shunt field excitation of the motor and it follows that where variations in the shunt field strength are made for the purpose of varying the speed of the motors, the regulation is affected by the disturbance of the ratio of compounding field strength and shunt field strength.

An object of my invention is to provide a control system for a plurality of dynamoelectric machines which are connected to a common load which shall function to divide the load between the machines in predetermined proportions.

Another object of the invention is to provide a control system for a plurality of dynamoelectric machines which are connected to a common load which shall function to so excite the machines as to provide a predetermined load division between the machines and to obtain the desired speed load characteristic curve for the machines.

A further object of the invention is to provide a control system for a plurality of dynamoelectric machines which are connected to a common load which shall function to provide excitation for the machines, both for compounding and load division control, in a single auxiliary winding on each machine.

Another object of the invention is to provide a control system for a plurality of dynamoelectric machines which are connected to a common load which shall function to provide excitation for the machines, both for compounding and load division control, in a single auxiliary winding on each machine and which shall function to automatically maintain the proper ratio of shunt and auxiliary field excitations to secure the best regulation of the machines over a wide speed range.

Figure 2:
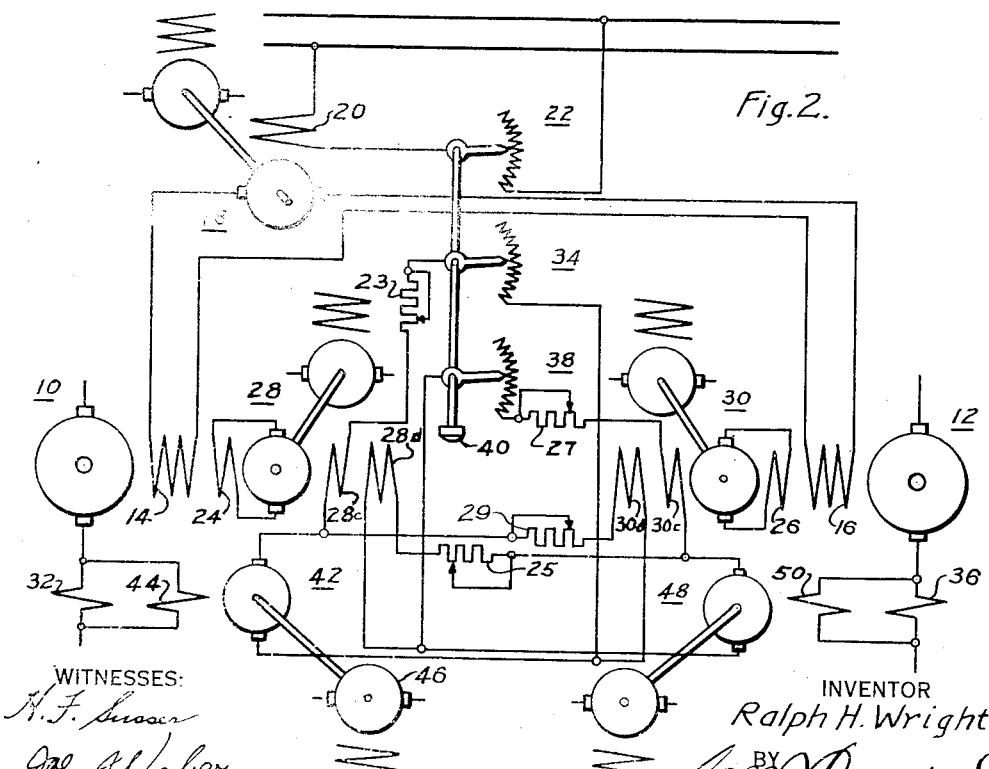

These and other objects and advantages of the invention will be apparent from the following detailed description taken in connection with the accompanying drawing in which:

Figure 1 is a diagrammatic illustration of the invention showing the cooperative relations of the several elements of the system; and Fig. 2 is a modification of the system of Fig. 1, showing the use of pilot exciters for energizing the load balance control windings.

In carrying out the invention in its preferred form, each of a pair of motors which are connected to drive a common load, is provided with a main or shunt field winding and an auxiliary or compounding field winding. Each of the auxiliary field windings is energized by an exciter, hereinafter referred to as a series exciter, which is provided with cumulative and differential field windings, the excitation of the cumulative field winding varying with the load on each of the motors and the excitation of the differential field winding varying with the load on the other motor. Excitation current for the cumulative and differential field windings of the series exciters may be supplied by pilot exciters which are excited in accordance with the load currents of their associated motors or the excitation of the series exciters may be provided by connecting their field windings across the interpole windings of the motors.

The cumulative field windings of the series exciters are connected in circuit with variable resistances and rheostats so that the proportional energizations of the cumulative and differential field windings may be varied to secure the proper auxiliary excitation for the motors for load balancing and speed regulation. The rheostats are also varied simultaneously with variation of the motor shunt field excitation for speed control so that the proper ratio of shunt and auxiliary field excitations for the best regulation may be maintained.

While only the embodiment of the invention which has to do with the control of twin motors is described in this specification, the principles of the invention may be applied equally as well to the speed regulation and load balance control of a greater number of motors which are connected to drive a common load, and to the voltage regulation and load balance control of a plurality of generators connected to supply a common load with proper connection. When the invention is used in connection with the control of generators supplying a common load the differential field winding of each series exciter is excited in accordance with the load of its associated generator and the cumulative field windings are excited in accordance with the load of the other generator.

Referring now to the drawing, there are shown in Fig. 1, motors 10 and 12 which may be connected to drive a common load, not shown. Motors 10 and 12 are excited by main field windings 14 and 16, respectively, which are connected in series circuit relation with the main exciter 18. The speed of motors 10 and 12 is varied by varying the energization of main field windings 14 and 16 and by varying the energization of field winding 20 of the main exciter 18 by means of a rheostat 22.

The motors 10 and 12 are also provided with auxiliary or compensating field windings 24 and 26, respectively, which are energized by continuously driven series exciters 28 and 30, respectively. The voltage outputs of the series exciters 28 and 30 are governed by the energization of their field windings 28c, 28d and 30c, 30d.

The field winding 28c of series exciter 28 is connected across the interpole winding 32 of its associated motor 10 in series circuit relation with a rheostat 34. The field winding 30d of the series exciter 30 associated with motor 12 is also connected across the interpole winding 32 of motor 10. In like manner, the field winding 30c of the series exciter 30 is connected across the interpole winding 36 of motor 12 in series circuit relation with a rheostat 38 and the field winding 28d of series exciter 28 is connected across the interpole winding 36 of motor 12.

The field windings 28c and 28d of the series exciter 28 are connected to oppose each other, so that the excitation of the series exciter 28 is the resultant of the difference of the excitations provided by these field windings. In a like manner, the field windings 30c and 30d of the series exciter 30 are connected in opposition, and the excitation of the series exciter 30 is the resultant of the difference of the excitations provided by these field windings.

The rheostats 22, 34 and 38 are connected to be operated simultaneously by the operating handle 40 or in any other suitable manner. The characteristics of the exciter field windings 28c and 30c, and the resistances in the circuits of these windings, are so chosen as to provide a greater number of ampere turns on the field windings 28c and 30c than on field windings 28d and 30d.

In the operation of the system, assuming that it is desired to have the load evenly distributed between motors 10 and 12 and that the load is evenly divided, the currents flowing in the interpole windings 32 and 36 will be equal and the voltage drops across these windings will therefore be equal, the same difference in energization will exist between the field windings 28c and 28d of the exciter 28 as exists between the field windings 30c and 30d of the exciter 30, and the auxiliary field windings 24 and 26 of the motors 10 and 12 will have equal energizations. Under these conditions the ampere turns on the auxiliary field windings 24 and 26 are so chosen as to provide the necessary amount of compounding for the motors 10 and 12 to give the desired speed-load characteristic.

If, now, motor 12 tends to take more than its share of the load for any reason, the voltage drop across its interpole winding 36 will increase due to the increased load current of motor 12. As a result, the energization of field winding 30c of series exciter 30 will increase, thus increasing the difference between the excitation of field windings 30c and 30d which, in turn, will cause an increased potential to be applied to the auxiliary field winding 26 of the motor 12. This will increase the excitation of motor 12, causing it to tend to decrease its speed and thus assume a smaller proportion of the total load. At the same time, the energization of field winding 28d of series exciter 28 will be increased due to the increase in the voltage drop across the interpole winding 36 of motor 12 and, since the energization of field winding 28c is normally greater than the energization of field winding 28d, the total excitation of the series exciter 28 will be decreased, causing a decrease in potential applied to auxiliary field winding 24 and resulting in decreased excitation of motor 10. This decreased excitation of motor 10 will cause it to tend to increase its speed and to assume a greater amount of the total load. Also, in the same manner, a decrease in load on motor 10 will tend to further strengthen field 26 and weaken field 24. In this manner the loads on the two machines will be automatically adjusted so that the machines will carry equal loads.

To provide the desirable speed-load characteristic curve for the motors, it is necessary that excitation of their auxiliary field windings 24 and 26 have a different value for each value of the excitation provided by the main field windings 14 and 16. This variation of the excitation of auxiliary windings 24 and 26 is provided by varying the resistance in circuit with field windings 28c and 30c of the exciters 28 and 30 at the same time that the energization of main field windings 14 and 16 is varied, by operating the rheostats 34 and 38, which are in series with the field windings 28c and 30c, at the same time that the rheostat 22 is operated to vary the excitation of generator 18 to vary the energization of main fields 14 and 16.

It is the usual practice in the operation of reversing rolling mills to reverse the mill rolls by reversing the excitation of the generator which supplies power to the armatures of the roll motors. This reversal of the armature current causes reversal of the current in the interpole windings 32 and 36. Since the main motor fields remain excited with the same direction of current flow, it is necessary in reversing the motors to reverse the connections from the interpoles in order to maintain the proper relation between the main fields 14 and 16 and the auxiliary fields 24 and 26 of the motors 10 and 12. The reversing switches 31 and 33 are provided for this purpose. These switches may be operated simultaneously with the reversing operation of the field of the main generator (not shown) which supplies power to the mill motors.

In Fig. 2 of the drawing, there is shown a modification of the system of Fig. 1 in which a pilot exciter is associated with each of the motors 10 and 12 to provide the energizing current for the field windings 28c, 28d, 30c and 30d of the series exciters 28 and 30. The pilot exciter 42 has its field winding 44 connected across the interpole winding 32 of motor 10 and is continuously driven by motor 46. The field winding 28c of the series exciter 28 and the field winding 30d of the series exciter 30 are connected to be energized by the pilot exciter 42. In like manner, a pilot exciter 48 is connected to energize field winding 30c of the series exciter 30 and field winding 28d of the series exciter 28, and has its field winding 50 connected to be energized by the drop across the interpole winding 36 of motor 12.

The operation of the system of Fig. 2 is substantially the same as that of the system shown in Fig. 1. It has the advantage, however, that better regulation of the currents in the field windings 28c, 28d, 30c and 30d is obtained since a greater potential is provided for these windings by the pilot exciters 42 and 48 than could ordinarily be supplied by potential drops across the interpole windings 32 and 36.

It is understood that such reversing switches as switches 31 and 33 of Fig. 1 may be provided if the motors 10 and 12 of the modification of Fig. 2 are to be reversible.

In the event that the motors 10 and 12 have different capacities and characteristics which make it desirable that the loads be divided between these motors in proportion to their capacities or if it is desired to divide the load in any other proportion, the ampere turns on the field windings 28c and 28d of the series exciter 28 and 30c and 30d of the series exciter 30 may be so adjusted as to obtain the desired load division. This may be done by varying the adjustable resistances 23, 25, 27 and 29 connected in series with each of the field windings 28c, 28d, 30c and 30d.

It will be seen that I have provided a system for automatically dividing the load between two motors which are connected to a common load and which, at the same time, may be adjusted simultaneously with the manually controlled variations in speed of the motor to provide such compounding of the motors as will produce the desired speed-load characteristic curve for the motors at all such adjusted speeds.

In compliance with the requirements of the patent statutes, I have shown and described herein the preferred embodiments of my invention. It is understood, however, that the invention is not limited to the precise constructions shown and described, but is capable of modification by one skilled in the art, the embodiments herein shown being merely illustrative of the principles of my invention.

I claim as my invention:

1. In a control system the combination with two motors connected to a common load, of a main field winding and an auxiliary field winding for each of the motors, means for energizing each of said auxiliary windings comprising a series exciter connected to each of said windings, a cumulative field winding and a differential field winding for each of said series exciters, a pilot exciter for each of the motors, means for exciting each of said pilot exciters in accordance with the load on its associated motor, means connecting each of said cumulative field windings of the series exciters to the pilot exciter of its associated motor, and means for connecting each of said differential field windings of the series exciters to the pilot exciter of the other motor.

2. In a control system, the combination with two motors connected to a common load, of a main field winding and an auxiliary field winding for each of the motors, means for energizing each of said auxiliary windings comprising a series exciter connected to each of said windings, a cumulative field winding and a differential field winding for each of said series exciters, a pilot exciter for each of the motors, means for exciting each of said pilot exciters in accordance with the load on its associated motor, means connecting each of said cumulative field windings of the series exciters to the pilot exciter of its associated motor, means for connecting each of said differential field windings of the series exciters to the pilot exciter of the other motor, and means for simultaneously varying the excitation of the main and auxiliary field windings of the motors.

3. A power transmission system comprising a plurality of dynamoelectric machines connected in driving relation to a common load, each of said dynamoelectric machines being provided with a separately excited main field winding and an auxiliary field winding, an exciter for each of said dynamoelectric machines for supplying excitation current to the auxiliary field winding of its associated dynamoelectric machine, said exciters being provided with differentially related field windings, means associated with each of the dynamoelectric machines for developing an excitation voltage for each exciter in accordance with the load current of its associated machine and means connecting one field winding of each exciter and a different field winding of another exciter to each of said voltage developing means, and resistor means for simultaneously adjusting the excitation currents of the main field windings of the dynamoelectric machines and the corresponding ones of the field windings of each of the exciters, thereby to maintain a predetermined division of load between the dynamoelectric machines.

RALPH H. WRIGHT.